United States Patent [19]

Lum et al.

[11] Patent Number: 5,439,952
[45] Date of Patent: Aug. 8, 1995

[54] SELF-CURING COATING COMPOSITION EXHIBITING REDUCED DISCOLORATION UPON STORAGE

[75] Inventors: Dorey Lum, Suffern, N.Y.; Patel Prashant, Aliso Viejo, Calif.

[73] Assignee: The Thompson Minwax Company, Montvale, N.J.

[21] Appl. No.: 171,037

[22] Filed: Dec. 21, 1993

[51] Int. Cl.$^6$ .......................... C08K 3/20; C08L 63/02
[52] U.S. Cl. ................................. 523/410; 525/454; 525/455; 526/318.44
[58] Field of Search ................ 523/410; 525/454, 455; 526/318.44

[56] References Cited

U.S. PATENT DOCUMENTS

| | | | |
|---|---|---|---|
| 4,906,684 | 3/1990 | Say | 524/548 |
| 4,987,186 | 1/1991 | Akiyama et al. | 525/107 |
| 5,006,413 | 4/1991 | Den Hartog et al. | 428/463 |
| 5,141,983 | 8/1992 | Hasegawa et al. | 524/457 |

FOREIGN PATENT DOCUMENTS

| | | |
|---|---|---|
| 56-135521 | 10/1981 | Japan . |
| 57-34118 | 2/1982 | Japan . |
| 2-103224 | 4/1990 | Japan . |
| 3-234727 | 10/1991 | Japan . |

*Primary Examiner*—Melvyn I. Marquis
*Assistant Examiner*—D. Aylward

[57] ABSTRACT

A coating composition is stable upon long term storage and provides a highly durable coating on various substrates, such as wood. It can be a clear coating or a staining composition. The critical components of the composition are a self-curing vinyl polymer, a neutralized polyurethane, a water-soluble catalyst to promote rapid curing under ambient conditions, and an aldehyde, carbodiimide or polyfunctional aziridine which reduces discoloration of the composition upon storage.

20 Claims, No Drawings

5,439,952

SELF-CURING COATING COMPOSITION EXHIBITING REDUCED DISCOLORATION UPON STORAGE

FIELD OF THE INVENTION

This invention relates to a water-based, storage stable coating composition which is self-curing at room temperature and which does not become discolored upon storage. In particularly, this invention relates to a water-based coating composition of a polyurethane and a self-curing acrylic polymer which can be applied to various substrates, such as wood, to provide a clear coating.

BACKGROUND OF THE INVENTION

Protective coatings for various substrates, including metals, wood, ceramics and paper products are desired to provide resistance to scuffing, abrasion, solvents foods and soiling. Many coating compositions are solvent-based which may be disadvantageous in use and proper disposal.

Various water,based blends of acrylic polymers and polyurethanes are known for application to various substrates, such as metals, ceramics and wood. For example, water-based coating compositions for base coats or clear coats of metal parts in automobiles are described in U.S. Pat. No. 4,954,559 (Hartog et al).

Such blends have a number of advantages, but also suffer from certain disadvantages, including their thermoplastic nature which limits durability and resistance to common household chemicals (such as detergents, bleach, ammonia), food products and soiling.

Two component coating systems have been produced which provide highly durable coatings which have desired resistance to the household chemicals, food products and soiling. However, these systems may present health hazards, and thus they are not amenable to use for the typical do-it-yourself consumer. Professional application is thus necessary.

There remains a need for a self-curing, water-based coating composition which can be readily used to provide a highly durable coating on wood or other substrates. It is desired that this composition not become discolored upon storage.

SUMMARY OF THE INVENTION

The discoloration problem noted above is overcome with a water-based, storage stable coating composition which is self-curing at room temperature, comprising:
a) an aqueous dispersion having a pH of from about 7.5 to about 10, and comprising a self-curing vinyl polymer prepared by addition polymerization of:
  i) an ethylenically unsaturated polymerizable monomer having an active methylene group,
  ii) an ethylenically unsaturated polymerizable monomer having an epoxy group,
  iii) an ethylenically unsaturated polymerizable carboxylic acid monomer, and
  iv) one or more additional ethylenically unsaturated polymerizable monomers other than those in groups i), ii) and iii),
  provided that:
    the weight ratio of monomer i) to monomer ii) is less than or equal to about 1:2 or greater than or equal to about 3:2 based on the total weight of monomers i) and ii),
    the weight ratio of monomer ii) to monomer iii) is greater than or equal to about 3:2 based on the total weight of monomers ii) and iii),
    the total amount of monomers i), ii) and iii) incorporated into the vinyl polymer is from about 8 to about 60 weight percent, and
    monomer iv) is present in an amount of from about 40 to about 92 weight percent, and
b) a polyurethane dispersion prepared by chain extension of a prepolymer reaction product of a diisocyanate and one or more polyols, at least one polyol being a carboxy-substituted polyol, the polyurethane being neutralized,
c) a water-soluble catalyst for initiating crosslinking of the self-curing vinyl polymer, and
d) at least about 0.01 percent, based on total composition weight of a compound selected from the group consisting of an aldehyde, a carbodiimide and a polyfunctional aziridine,
the weight ratio of the self-curing vinyl polymer to the polyurethane being from about 1:9 to about 9:1.

This invention also provides a method for preparing a water-based, storage stable coating composition which is self-curing at room temperature, comprising:
A) providing, in any order:
  a) the aqueous dispersion described above,
  b) the polyurethane dispersion described above,
  c) the water-soluble catalyst described above, and
  d) at least about 0.01 percent, based on total composition weight of a compound selected from the group consisting of an aldehyde, a carbodiimide and a polyfunctional aziridine,
  the weight ratio of the self-curing vinyl polymer to the polyurethane being from about 1:9 to about 9:1, and
B) mixing a), b), c) and d) in water with stirring.

The coating composition of this invention has a number of advantages. First of all, it is self-curing at room temperature so that when the user applies it to a substrate, it will dry to a highly durable and stain resistant coating very quickly without application of heat or chemical reagents. The resulting coating is resistant to most household solvents, detergents and foods. Professional application is not necessary since the components are present in a single dispersion which is easily and safely applied by typical "do it yourself" consumers. Further still, the coating composition does not become discolored with a pinkish color upon storage.

These advantages are achieved by using a unique aqueous blend of a carboxylated vinyl polymer which contains recurring units of active methylene groups which provide sites for polymer crosslinking or self-curing. In addition, the blend contains certain amounts of a polyurethane to provide coating durability. The discoloration problem was solved by including in the composition at least about 0.01 weight percent of one or more aldehydes, carbodiimides or polyfunctional aziridines, as described in more detail below.

DETAILED DESCRIPTION OF THE INVENTION

The coating composition of this invention has excellent adhesion and provides a finish on various substrates (including wood, leather, metal, polymers, glass, cloth, paper, and foam) which is hard, durable and resistant to various household chemicals. In particular, various woods can be coated with the coating composition to provide moisture resistance as well as staining if desired.

The composition can be applied to the substrate using any conventional method, including brushing, dipping, flow coating, spraying and others readily apparent to one skilled in the art.

A first critical component of the composition to provide ambient, self-curing properties is a self-curing, water-dispersible vinyl polymer which can be supplied in the form of an aqueous dispersion having a pH of from about 7.5 to about 10 (preferably from about 8 to about 9).

This vinyl polymer is prepared from four or more α, β-unsaturated ethylenically unsaturated polymerizable monomers using conventional emulsion polymerization techniques with conventional free radical initiators and anionic or nonionic (or mixtures of either or both) surfactants. Typical conditions for polymerization are well known in the art, including for example U.S. Pat. No. 4,906,684 (Say), incorporated herein by reference with respect to the monomers and polymerization conditions described therein. The vinyl polymer generally has a glass transition temperature of less than or equal to 60° C. so as to minimize the amount of coalescing agent that may be needed in the dispersion.

There are four types of α, β-ethylenically unsaturated polymerizable monomers used to prepare the noted vinyl polymer.

First of all, one or more monomers having an active methylene group are used. An "active methylene group" is defined in the art as a methylene group positioned between two electronegative groups (such as, but not limited to, carbonyl and cyano groups), which is capable of Michael addition across double bonds and reactive with epoxy groups. Malonic esters, acetoacetic esters, cyanoacetic esters and 1,3-diketones are examples of compounds containing "active methylene groups". Useful monomers include, but are not limited to, 2-acetoacetoxyethyl acrylate, 2-acetoacetoxyethyl methacrylate, N-(2-cyanoacetoxyethyl)acrylamide, 4-cyanoacetyl-1-methacyloylpiperazine, N-(2-propionylacetoxybutyl)acrylamide, N-(2-valerylacetoxyphenyl)acrylamide, N-4-(acetoacetoxymethyl)benzylmethacrylaminde, N-4-(acetoacetoxybenzyl)phenylmethacrylamide, N-2-(acetoacetoxybenzyl)acrylamide, N-(3-acetoacetamidopropyl)methyacrylamide, N-(2-acetoacetamidoethyl)methyacrylamine, 4-acetoacetyl-1methacryloylpiperazine, acetoacetamidoethyl methyacrylate, 4-acetoacetyl-1-acryloylpiperazine, N-(2propionylacetoxyethyl)acrylamide, N-(2-valerylacetoxypropyl)methacrylamine and others which would be readily apparent to one skilled in polymer chemistry. The monomers 2-acetoacetoxyethyl acrylate and 2-acetoacetoxyethyl methacrylate are preferred. Any of these monomers can be readily prepared using known procedures and starting materials, or purchased from any of several commercial sources.

One or more ethylenically unsaturated polymerizable monomers having one or more epoxy groups are also used in preparing the self-curing vinyl polymer. Such monomers can be prepared by esterification of carboxylated monomers, such as acrylic or methacrylic ! acid, with glycidol or with epichlorohydrin followed by dehydrohalogenation. Particularly useful epoxy-containing monomers include, but are not limited to, glycidyl acrylates, glycidyl methacrylates, allyl glycidyl ethers, and others which would be readily apparent to one skilled in polymer chemistry. Particularly useful are glycidyl acrylate and glycidyl methacrylate.

A third type of monomer incorporated into the self-curing polymer described herein includes those having one or more carboxylic acid groups. Generally, such monomers contain from 3 to 24 carbon atoms and one or more carboxy groups per molecule. Such monomers include, but are not limited to, acrylic acid, methacrylic acid, maleic acid, fumaric acid, itaconic acid, aconitic acid, β-carboxyethyl acrylate, β-carboxyethyl methacrylate, m&p-carboxymethylstyrene, methacrylamidohexanoic acid, N-(2-carboxy-1,1-dimethylethylacrylamide, ethacrylic acid, crotonic acid, citraconic acid and half esters of the dicarboxylic acids wherein the esterified alcohol group contains from 1 to 20 carbon atoms. Examples of suitable half esters are methyl hydrogen fumarate, benzyl hydrogen itaconate, dodecyl hydrogen citraconate and others readily apparent to one skilled in the art. Preferred monomers are acrylic acid and methacrylic acid.

The fourth type of monomers used to prepare the self-curing vinyl polymer includes one or more α, β-ethylenically unsaturated polymerizable monomers other than those in the three groups described above which are copolymerizable with those monomers but not reactive with the active methylene, epoxy or carboxy groups of those three groups of monomers under the conditions of polymerization. Such monomers include, but are not limited to, acrylic and methacrylic acid esters (both mono- and diesters) and amides, wherein the ester group has 1 to 20 carbon atoms, vinyl aromatics, vinyl ethers, vinyl ketones, nitriles, aliphatic vinyl esters, and others readily apparent to one skilled in the art. Representative of such monomers include, but are not limited to, methyl acrylate, methyl methacrylate, ethyl acrylate, ethyl methacrylate, isopropyl acrylate, isopropyl methacrylate, butyl acrylate, butyl methacrylate, 2-ethylhexyl methacrylate, hexanediol diacrylate, decyl acrylate, lauryl methacrylate, benzyl acrylate, 2-hydroxyethylmethacrylate, ethylene dimethacrylate, acrylamide, methacrylamide, maleamide, N-methylacrylamide, itaconic acid amide, N-ethoxymethylacrylamide, N-methylolacrylamide, acrylonitrile, styrene, vinyltoluene, 4-t-butylstyrene, α-methylstyrene, 2-chloromethylstyrene, divinylbenzene, p-styrenesulfonate, sodium acrytamido-2-methylpropanesulfonate, sodium 3-acryloyloxypropanesulfonate, vinyl formate, vinyl acetate, vinyl propionate, vinyl butyrate, butadiene, isoprene, vinyl methyl ketone and vinyl butyl ketone. Preferred monomers are methyl methacrylate, butyl acrylate and mixtures of both.

The four types of monomers described above are copolymerized in certain ratios to provide the desired properties described herein. In particular, the weight ratio of one or more monomers i) containing the active methylene groups to the one or more monomers ii) containing epoxy groups is less than or equal to about 1:2 or greater than or equal to about 3:2 based on the total weight of monomers i) and ii). Also, the weight ratio of the one or more monomers ii) to the one or more monomers iii) is greater than or equal to about 3:2 based on the total weight of the two types of monomers. Moreover, the total amount of monomers i), ii) and iii) is from about 8 to about 60 weight percent of the total polymer weight and the one or more monomers iv) are present at from about 40 to about 92 weight percent.

Generally, the solids content of the aqueous dispersion containing the vinyl polymer is from about 20 to about 70 percent with from about 40 to about 60 percent being preferred. Most of the solids will be the vinyl polymer.

After emulsion polymerization, the pH of the emulsion can be adjusted to the appropriate pH using water soluble bases, such as alkali metal, ammonia or ammonium hydroxide bases. Useful bases are well known in the art, but tetramethylammonium hydroxide is preferred.

One skilled in the art would readily be able to formulate any of the aqueous dispersions of self-curing vinyl polymers described herein using the foregoing teaching as well as that provided in U.S. Pat No. 4,906,684 (noted above). A preferred latex dispersion containing a preferred self-curing vinyl polymer is commercially available, from Rhone-Poulenc, Inc. (Cranbury, N.J.) under the trademark AMBICURE ® XP 150.

Polyurethane dispersions are also included in the coating composition of this invention. This material is prepared by diamine chain extension of a prepolymer reaction product of a diisocyanate and one or more polyols, at least one polyol being a carboxy-substituted diol. For example, the polyurethane can be prepared by reacting a diisocyanate, a glycol and a carboxy-substituted diol to form a prepolymer under conventional conditions, neutralizing the prepolymer (as described below), and extending the polymer chain using conventional techniques and chain extenders.

Diisocyanates useful in the preparation of the polyurethane include aliphatic, alicyclic, araliphatic and aromatic diisocyanates which are conventionally used in such technology. Examples include, but are not limited to, ethylene diisocyanate, tetramethylene diisocyanate, 2,3-dimethylethylene diisocyanate, ethylethylene diisocyanate, 1,6-hexamethylene diisocyanate, 1,12-dodecane diisocyanate, 2-methylpentamethylene diisocyanate, 2,4,4-trimethylhexamethylene diisocyanate, isophorone diisocyanate, 1,3-cyclopentylene diisocyanate, cyclohexylene-1,4-diisocyanate, 4,4'-dicyclohexylmethane diisocyanate, 4,4'-dicyclohexylmethane diisocyanate, lysine diisocyanate, 3,3'-dimethyl-4,4'-biphenylene diisocyanate, 3,3'-dimethoxy-4,4'-biphenylene diisocyanate, 3,3'-dichloro 4,4'-biphenylene diisocyanate, 1,5-tetrahydronaphthalene diisocyanate, p-xylylene diisocyanate, tetramethylxylylene diisocyanate, 1,4-phenylene diisocyanate, 2,4-tolylene diisocyanate, 2,6-tolylene diisocyanate, 4,4'-diphenylmethane diisocyanate, 2,4'-diphenylmethane diisocyanate, 1,5-naphthylene diisocyanate and bis(4-isocyanatocycloether-4,4- diisocyantodiphenylhexyl)methane. Mixtures of diisocyanates can be used also.

Aliphatic and alicyclic diisocyanates, such as isophorone diisocyanate, tetramethylxylylene diisocyanate, 1,12-dodecane isocyanate, 1,4-cyclohexane diisocyanate, 1,6-hexamethylene diisocyanate, 4,4-dicyclohexylmethane diisocyanate, 2-methylpentamethylene diisocyanate and 2,4,4-trimethylhexamethylene diisocyanate are preferred with 4,4'-dicyclohexylmethane diisocyanate being most preferred.

Polyols which are not carboxy-substituted and which can be used in the preparation of the prepolymer include any in the various chemical classes of polyols (such as diols, triols and glycols) which are conventionally used in this art. The polyols can be polyesters, polyesteramides, polythioethers, polyethers, polycarbonates, polyacetals, polyolefins or polysiloxanes. Mixtures of such polyols can also be used.

Polyester polyols include hydroxy-terminated reaction products of polyhydric alcohols with polycarboxylic acids or their ester-forming derivatives. Polyether polyols include the products of polymerization of a cyclic oxide or by the addition of one or more oxides to polyfunctional initiators. Polythioether polyols include products obtained by condensing thiodiglycol ether alone or with other glycols, dicarboxylic acids, formaldehyde, aminoalcohols or aminocarboxylic acids. Polycarbonate polymers include products obtained by reacting diols with diaryl carbonates or with phosgene. Polyacetal polyols includes those prepared by reacting glycols with formaldehyde. Suitable polyolefin polyols include hydroxy-terminated butadiene homo and copolymers.

Examples of useful polyols include, but are not limited to, ethylene glycol, diethylene glycol, triethylene glycol, 1,2-propylene glycol, 1,3-butylene glycol, tetramethylene glycol, 1,6-hexanediol, neopentyl glycol, hexamethylene glycol, decamethylene glycol, octanediol, tricyclodecanedimethylol, furan dimethanol, hydrogenated bisphenol A, cyclohexandimethanol, glycerol, trimethylolpropane, pentaerythritol and others readily apparent to one skilled in the art. Other useful polyols are described, for example, in U.S. Pat. Nos. 4,927,876 and 5,137,961 (both noted above). Polyester diols, such as 1,6-hexanediol and cyclohexanedimethanol and glycols such as neopentyl glycol adipate, poly(hexamethylene adipate) glycol, poly (tetramethylene) glycol, poly (caprolactone) glycol, poly (carbamate) glycol and poly(tetramethylene adipate)-glycol are preferred in the practice of this invention, with 1,6-hexanediol, cyclohexanedimethanol and neopentyl glycol adipate being most preferred.

Additional teaching of materials useful in preparing prepolymers for eventual preparation of a useful polyurethane are provided in U.S. 4,066,591 (Scriven et al), incorporated herein by reference.

Also used in preparing the prepolymer are one or more carboxy-substituted polyols (for example, diols or triols) such as dihydroxyalkanoic acids, for example, 2,2-dimethylolpropionic acid, and aminocarboxylic acids, for example lysine, cystine and 3,5-diaminobenzoic acid. Most preferred in the practice of this invention is 2,2-dimethylolpropionic acid.

The prepolymers are prepared in a conventional manner by,reacting a stoichiometric excess of the diisocyanate with the polyols, including the carboxy-substituted polyol under substantially anhydrous conditions at a temperature in the range of from about 30 to about 130° C. until reaction between the diisocyanate and the polyols is substantially complete. The diisocyanate and the polyols are present in such proportions that the ratio of isocyanate groups to the hydroxy groups is in the range of from about 1.1:1 to about 6:1, and preferably in the range of from about 1.5:1 to about 3:1.

If desired, catalysts such as dibutyltin dilaurate and stannous octoate may be used to assist prepolymer formation and a non-reactive solvent may be added before or after prepolymer formation to control the viscosity. Suitable solvents which may be used include, but are not limited to, acetone, methylethylketone, N,N-dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The water-miscible solvents in the foregoing list are preferred.

A particularly useful. polyurethane is prepared by making a prepolymer from poly (1,6-hexanediol/neopentyl glycol adipate), 2,2-dimethylol propionic acid, and 4,4'-dicyclohexylmethane diisocyanate, followed by neutralization with ammonium ion, and chain extension using hydrazine. This polyurethane is commercially available in an aqueous dispersion from Zeneca Resins, Ltd. as NEOREZ XR 9684. Particular details for preparing this and other useful polyurethanes are provided in U.S. Pat. No. 4,066,591 (noted above, particularly Example 16)

Aqueous polyurethane dispersions can be prepared by dispersing the water-dispersible prepolymer in an aqueous medium and chain extending the prepolymer with an active hydrogen containing chain extender. Dispersing the prepolymer is water can be accomplished using well known techniques. Preferably, it is added to water with agitation. Alternatively, water can be stirred into the prepolymer.

Conversion of the carboxyl groups in the prepolymer to ionic salt groups (also known as neutralization) can be achieved before, simultaneously with or after prepolymer dispersion in water. Neutralization is achieved using any of the compounds known for this purpose, such as tertiary amines (including, but not limited to, triethylamine, triethanolamine, methyldiethanolamine, methyldiethylamine), quaternary ammonium hydroxide, tetramethylammoniumhydroxide, ammonia in its free form, or ammonium hydroxide in an amount of at least about 0.5%, by weight. From about 1 to about 3%, by weight, is preferred. Ammonia or ammonium hydroxide is preferred for neutralization to provide improved storage stability to the coating composition.

Suitable chain extenders include, but are not limited to, ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris(2-aminoethyl)amine, 3,3'-dinitrobenzidine, 4,4'-methylenebis(2-chloroaniline), isophorone diamine, 3,3'-dichloro-4,4'-biphenyl diamine, various hydrazines and other compounds readily apparent to one skilled in the art. Preferred chain extenders are isophorone diamine, ethylene diamine, diethylene triamine, cyclohexane diamine and hydrazine.

The chain extender can be added to the aqueous dispersion of the prepolymer, or it may be already present when the prepolymer is dispersed in the water. Chain extension can be conducted at any convenient temperature within the range of from about 5 to about 95° C. The amount of chain extender should be approximately equivalent to the free isocyanate groups in the prepolymer, and the ratio of active hydrogen in the chain extender to isocyanate groups is preferably in the range of from about 1:1 to about 2:1.

The self-curing vinyl polymer and polyurethane described herein are dispersed in water by simply blending aqueous dispersions of each material together with appropriate stirring under ambient conditions (room temperature and humidity). Mixtures of vinyl polymers and polyurethanes can be used if desired. The weight ratio of self-curing vinyl polymer to the polyurethane in the final dispersion is from about 1:9 to about 9:1, with a ratio of from about 1:4 to about 4:1 being preferred. Ratios of from about 1:1 to about 3:1 are more preferred. Other techniques for forming the final dispersion would be readily apparent to one skilled in the art. The viscosity of the final dispersion is generally from about 20 to about 1000 centipoise, with a viscosity less than 100 centipoise being preferred. The percent solids (polymers and other additives) will be within the range of from about 20 to about 70%. The pH of the final coating composition is generally from about 7.5 to about 10, with a preferred pH in the range of from about 7.5 to about 8 ("about" referring to a 0.2 variation) being preferred. The polymers and other components can be added to water in any order, but preferably, the vinyl polymer dispersion is prepared or provided first and all other components including the polyurethane are added to it with appropriate stirring.

Included in the coating composition of this invention are one or more water-soluble catalysts for initiating crosslinking of the self-curing vinyl polymer. Such compounds are generally water-soluble compounds which will promote the crosslinking reactions among the reactive groups on the vinyl polymer. More particularly, the crosslinking occurs between the active methylene and glycidyl groups, and the glycidyl and carboxyl groups. Particularly useful catalysts include, but are not limited to, alkali metal or ammonium hydroxides, such as sodium hydroxide, potassium hydroxide, ammonium hydroxide, tetraalkylammonium hydroxides (such as tetramethylammonium hydroxide) and others readily apparent to one skilled in the art. A preferred catalyst is tetramethylammonium hydroxide. The amount of catalyst in the composition of this invention is generally added to a pH of about 9.

It is also critical that the composition of this invention include at least about 0.01, and preferably from about 0.04 to about 2 percent (based on total composition weight) of a water-soluble or water-dispersible material which reduces or prevents discoloration over a period of time. Such materials include aldehydes, water-soluble carbodiimides and polyfunctional aziridines. The mechanism of discoloration prevention is unknown, and the various compounds may be effective to varying degrees. A more preferred amount of such compounds is from about 0.2 to about 1.6 weight percent. Mixtures can be used if desired.

Particularly useful aldehydes are aliphatic and aromatic aldehydes, and include, but are not limited to benzaldehyde, formaldehyde, paraformaldehyde, acetaldehyde propionaldehyde, n-butyraldehyde, p-tolualdehyde, phenylacetaldehyde, α-methylvaleraldehyde and isocaptroaldehyde. Benzaldehyde at about 0.3 weight % is most preferred.

Useful water-soluble carbodiimides have been used in the art to provide crosslinking sites in vinyl polymers, for example, as described in U.S. Pat. No. 5,006,413 (Hartog et al). In the present invention, however, they reduce discoloration in the coating composition, but the mechanism for that improvement is unknown. Generally useful carbodiimides have the formula

wherein R and R' are independently substituted or unsubstituted alkyl of 2 to 12 carbon atoms, (such as ethyl, isopropyl, t-butyl, hexyl, decyl, benzyl, ethyl morpholinyl, ethyl piperidyl and dodecyl), substituted or unsubstituted cycloalkyl of 5 to 7 carbon atoms in the ring (such as cyclopentyl, cyclohexyl and cycloheptyl), substituted or unsubstituted aryl of 6 to 10 carbon atoms in the ring (such as phenyl and naphthyl), substituted or unsubstituted morpholino, substituted or unsubstituted piperidyl and other groups which would be readily apparent to one skilled in the art. U.S. Pat. No. 3,857,931 (Hager) is incorporated herein by reference with respect to its disclosure relating to carbodiimides and how they can be manufactured.

One useful carbodiimide is marketed by Union Carbide Corporation under the trademark UCARLNK ™ Crosslinker XL-25SE. Other useful carbodiimides are readily prepared using known methods or commercially available and include, but are not limited to, 1-cyclohexyl-3-[2-morpholinyl-(4)-ethyl]carbodiimide metho-p-toluenesulfonate, dicyclohexyl carbodiimide and ethylmorpholinocarbodiimide.

Useful polyfunctional aziridines are compounds which have two or more aziridinyl groups. They include, but are not limited to, trimethylolpropane-tris [B-(N-aziridinyl)propionate], 2-[3-(1-aziridinyl)propionyloxymethyl]1,3-bis[3-(2-methyl-1-aziridinyl)propionyloxymethyl]- 2-ethylpropane (CAS 64265-57-2 ), and pentaerythritol-tris [B- (Naziridinyl)propionate]. These materials are readily available commercially (for example, from Zeneca Resins, Inc.), or prepared using known methods.

The composition of this invention can optionally contain minor amounts (less than about 15 weight percent) of one or more organic solvents, pigments, dyes, emulsifiers, surfactants, thickeners, levelling agents, defoamers agents, freeze-thaw additives, coalescing agents, fillers, UV absorbers, plasticizers, antioxidants and other materials which would be readily apparent to one skilled in the art. The composition can also include one or more pigments to provide a desired staining of the coated substrate, and one or more coalescing agents to promote formation of a clear, smooth coating. The amounts of such optional components useful in the compositions would be readily apparent to one skilled in the art.

The composition of this invention is quite stable over long term storage. By "storage stable", we mean that the composition does not coagulate when stored at about 55° C. for at least 10 days. The composition is also self-curing under ambient conditions of "room temperature" and relative humidity. By "room temperature" is meant generally in the range of from about 10 to about 35° C. Ambient relative humidity for best self-curing is from about 25 to about 80%. No external heat is necessary to cause curing of the polymer after the coating composition is applied to the substrate.

The following examples are provide to illustrate, but not limit, the scope of this invention. Unless otherwise noted, all percentages are by weight.

Example 1

Preferred Coating Composition

This example shows the formulation of a preferred coating composition of this invention.

The coating Composition was prepared by blending the followings ingredients with stirring, in the order listed at room temperature. Each ingredient was added slowly and mixed for 10–15 minutes before the next addition was made. The noted amounts are weight percent based on total composition weight.

| Composition Ingredients: | |
|---|---|
| AMBICURE ™ XP 150 vinyl polymer | 42.5% |
| Water | 15.7% |
| Benzaldehyde | 0.3% |
| SURFYNOL ™ 502 nonionic surfactant | 2.75% |

-continued

| | |
|---|---|
| (Air Products and Chemicals) | |
| N-methylpyrrolidone coalescing agent | 4.0% |
| Ethylene glycol | 1.25% |
| Dibutyl phthalate plasticizer | 0.25% |
| NEOREZ XR 9684 polyurethane | 29.2% |
| SURFYNOL ™ DF-58 defoamer (Air Products and Chemicals) | 0.05% |
| 392N35 wax emulsion (Chemical Corp. of America) | 4.0% |

Example 2

Comparison of Composition Discoloration

The preferred composition of this invention (shown in Example 1) is compared to a coating composition which is outside the scope of this invention. This Control composition was like the composition of Example 1 except benzaldehyde and the defoamer were omitted.

The Control composition was put into a container and incubated at about 55° C. and checked daily. After two days, the composition had turned pink in color. The composition of this invention, when similarly treated, did not show the discoloration.

Example 3

Use of Carbodiimide to Prevent Discoloration

This example is similar to the foregoing examples except that the coating composition of this invention contained 0.5 weight % of the carbodiimide marketed as UCARLNK ™ Crosslinker XL-25SE by Union Carbide Corporation, in place of the benzaldehyde. The discoloration test was similarly carried out and only slight discoloration was observed after five days at about 55° C.

Example 4

Use of Polyaziridine to Prevent Discoloration

This example is similar to Examples 1 and 2 except that the coatingS composition of this invention contained 1.2 weight % of the polyfunctional aziridine, 2-[3-(1-aziridinyl)propionyloxymethyl]-1,3-bis[3-(2-methyl -1-aziridinyl)propionyloxymethyl]2-ethylpropane (available from Zeneca Resins, Inc.), in place of the benzaldehyde. The discoloration test was similarly carried out and only slight discoloration was observed after 16 days at 55° C.

Example 5

Use of Paraformaldehyde to Prevent Discoloration

This example is similar to Examples 1 and 2 except that the coating composition of this invention contained 0.012 weight percent of paraformaldehyde in place of benzaldehyde. The discoloration test was similarly carried out and no discoloration was observed after 11 days at 55° C.

The invention has been described in detail with particular reference to preferred embodiments thereof, but it will be understood that variations and modifications can be effected within the spirit and scope of the invention.

We claim:

1. A water-based, storage stable coating composition which is self-curing at room temperature, comprising:
   a) an aqueous dispersion having a pH of from about 7.5 to about 10, and comprising a self-curing vinyl polymer prepared by addition polymerization of:

i) an ethylenically unsaturated polymerizable monomer having an active methylene group, ii) an ethylenically unsaturated polymerizable monomer having an epoxy group, iii) an ethylenically unsaturated polymerizable carboxylic acid monomer, and iv) one or more additional ethylenically unsaturated polymerizable monomers other than those in groups i) ii) and iii), provided that:

the weight ratio of monomer i) to monomer ii) is less than or equal to about 1:2 or greater than or equal to about 3:2 based on the total weight of monomers i) and ii), the weight ratio of monomer ii) to monomer iii) is greater than or equal to about 3:2 based on the total weight of monomers ii) and iii), the total amount of monomers i), ii) and iii) incorporated into said vinyl polymer is from about 8 to about 60 weight percent, and monomer iv) is present in an amount of from about 40 to about 92 weight percent, b) a polyurethane dispersion prepared by chain extension of a prepolymer reaction product of a diisocyanate and one or more polyols, at least one polyol being a carboxy-substituted polyol, said polyurethane being neutralized, c) a water-soluble catalyst for initiating crosslinking of said self-curing vinyl polymer, and d) at least about 0.01 percent, based on total composition weight, of a compound selected from the group consisting of an aldehyde, a carbodiimide and a polyfunctional aziridine, the weight ratio of said self-curing vinyl polymer to said polyurethane being from about 1:9 to about 9:1.

2. The composition of claim 1 wherein the pH of said aqueous dispersion is from about 8 to about 9, said monomer i) is either acetoacetoxyethyl acrylate or acetoacetoethyl methacrylate, said monomer ii) is either glycidyl acrylate or glycidyl methacrylate, said monomer iii) is acrylic acid or methacrylic acid, and said monomer iv) is methyl methacrylate or butyl acrylate.

3. The composition of claim 1 wherein the weight percent solids of said aqueous vinyl polymer dispersion is from about 20 to about 70%.

4. The composition of claim 1 wherein said water-soluble catalyst is tetramethylammonium hydroxide.

5. The composition of claim 1 wherein said polyurethane is prepared by diamine chain extension of a prepolymer reaction product of an 4,4'-dicyclohexylmethylene diisocyanate, poly(1,6-hexanediol/neopentyl glycol adipate) and 2,2-dimethylol propionic acid.

6. The composition of claim 1 wherein the weight ratio of said self-curing vinyl polymer to said polyurethane is from about 1:4 to about 4:1.

7. The composition of claim 1 wherein the weight ratio of said self-curing vinyl polymer to said polyurethane is from about 1:1 to about 3:1.

8. The composition of claim 1 further comprising a coalescing agent, defoamer, mar resistance additive, surfactant or plasticizer.

9. The composition of claim 1 further comprising a pigment.

10. The composition of claim 1 wherein said polyurethane is neutralized with ammonia or ammonium hydroxide.

11. The composition of claim 1 wherein said polyurethane is prepared using aliphatic or alicyclic diisocyanates only.

12. The composition of claim 1 wherein said aldehyde, carbodiimide or polyfunctional aziridine is present in an amount of from about 0.04 to about 2 weight percent.

13. The composition of claim 1 wherein said aldehyde, carbodiimide for polyfunctional aziridine is present in an amount of from about 0.2 to about 1.6 weight percent.

14. The composition of claim 1 comprising an aliphatic or aromatic aldehyde.

15. The composition of claim 14 comprising benzaldehyde in an amount of about 0.3 weight percent.

16. A method for preparing a water-based storage stable coating composition which is self-curing at room temperature, comprising:

A) providing, in any order:

a) an aqueous dispersion having a pH of from about 7.5 to about 10, and comprising a self-curing vinyl polymer prepared by addition polymerization of:

i) an ethylenically unsaturated polymerizable monomer having an active methylene group, ii) an ethylenically unsaturated polymerizable monomer having an epoxy group, iii) an ethylenically unsaturated polymerizable carboxylic acid monomer, and iv) one or more additional ethylenically unsaturated polymerizable monomers other than those in groups i), ii) and iii), provided that:

the weight ratio of monomer i) to monomer ii) is less than or equal to about 1:2 or greater than or equal to about 3:2 based on the total weight of monomers i) and ii), the weight ratio of monomer ii) to monomer iii) is greater than or equal to about 3:2 based on the total weight of monomers ii) and iii), the total amount of monomers i), ii) and iii) incorporated into said vinyl polymer is from about 8 to about 60 weight percent, and monomer iv) is present in an amount of from about 40 to about 92 weight percent, b) a polyurethane dispersion prepared by chain extension of a prepolymer reaction product of a diisocyanate and one or more polyols, at least one polyol being a carboxy-substituted polyol, said polyurethane being neutralized, c) a water-soluble catalyst for initiating crosslinking of said self-curing vinyl polymer, and d) at least about 0.01 percent, based on total composition weight, of a compound selected from the group consisting of an aldehyde, a carbodiimide and a polyfunctional aziridine, the weight ratio of said self-curing vinyl polymer to said polyurethane being from about 1:9 to about 9:1, and mixing a), b), c) and d) in water with stirring.

17. The method of claim 16 wherein said polyurethane is added to an aqueous dispersion of said self-curing vinyl polymer.

18. The method of claim 16 wherein d) is an aromatic aldehyde.

19. The method of claim 18 wherein said aromatic aldehyde is benzaldehyde.

20. The method of claim 16 wherein d) is a carbodiimide or polyfunctional aziridine.

* * * * *